(12) United States Patent
Takashima et al.

(10) Patent No.: US 8,869,716 B2
(45) Date of Patent: Oct. 28, 2014

(54) PARTICLE SEPARATOR AND SOLID FUEL BURNER

(75) Inventors: Ryuhei Takashima, Nagasaki (JP); Yuichi Ide, Nagasaki (JP); Tomohiro Yamauchi, Nagasaki (JP); Koutaro Fujimura, Nagasaki (JP); Toshihiro Hirata, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 615 days.

(21) Appl. No.: 12/741,499

(22) PCT Filed: Jul. 24, 2008

(86) PCT No.: PCT/JP2008/063255
§ 371 (c)(1),
(2), (4) Date: May 18, 2010

(87) PCT Pub. No.: WO2009/069340
PCT Pub. Date: Jun. 4, 2009

(65) Prior Publication Data
US 2010/0242813 A1  Sep. 30, 2010

(30) Foreign Application Priority Data
Nov. 30, 2007  (JP) .................. 2007-310591

(51) Int. Cl.
| F23D 1/00 | (2006.01) |
| F23K 3/02 | (2006.01) |
| B04C 5/04 | (2006.01) |
| B01D 45/16 | (2006.01) |
| F22B 37/00 | (2006.01) |
| B01D 45/08 | (2006.01) |

(52) U.S. Cl.
CPC ... B04C 5/04 (2013.01); F23K 3/02 (2013.01); B01D 45/16 (2013.01); F22B 37/00 (2013.01); B01D 45/08 (2013.01)
USPC ............. 110/263; 110/101 R; 95/271; 55/393

(58) Field of Classification Search
CPC ........... B04C 5/04; F22B 37/00; B01D 45/16; B01D 45/08; F23K 3/02

USPC ............... 110/263, 266, 342, 101 R, 101 CF, 110/104 R; 95/216, 219, 221, 218, 271, 267, 95/269; 96/60, 61, 209; 55/337, 459.1, 55/393
See application file for complete search history.

(56) References Cited

U.S. PATENT DOCUMENTS 911,258 A * 2/1909 Neumann ..................... 209/719
2,604,185 A * 7/1952 Johnstone et al. .............. 95/219

(Continued)

FOREIGN PATENT DOCUMENTS

| JP | 61-51954 U | 4/1986 |
| JP | 3-241208 A | 10/1991 |

(Continued)

OTHER PUBLICATIONS

Chinese Office Action dated Nov. 24, 2011, issued in corresponding Chinese Patent Application No. 200880115394.8.

(Continued)

Primary Examiner — Kenneth Rinehart
Assistant Examiner — Bao D Nguyen
(74) Attorney, Agent, or Firm — Westerman, Hattori, Daniels & Adrian, LLP (57) ABSTRACT

A particle separator capable of enhancing the collection efficiency while minimizing an augmentation of auxiliary machinery power and an increase of the device size is provided. A particle separator that separates powder being transported on an air flow in a state of a solid-gas two-phase flow from the air flow and collects the powder is provided with a drift generating portion provided in the vicinity of a main body connecting portion of a solid and gas supply tube for letting the solid-gas two-phase flow stream inside a separator main body from the circumferential direction and configured to concentrate a high powder particle concentration of the solid-gas two-phase flow on the outer peripheral side of the separator main body.

2 Claims, 8 Drawing Sheets (56) References Cited

U.S. PATENT DOCUMENTS

| | | | | |
|---|---|---|---|---|
| 4,159,073 | A | * | 6/1979 | Liller ............................ 228/125 |
| 4,175,036 | A | * | 11/1979 | Frykhult ........................ 209/734 |
| 4,344,538 | A | * | 8/1982 | Fujisawa et al. .............. 209/719 |
| 4,412,496 | A | * | 11/1983 | Trozzi ........................... 101/347 |
| 4,789,476 | A | * | 12/1988 | Schulz ............................ 55/460 |
| 4,848,993 | A | * | 7/1989 | Elkjaer ........................ 55/459.1 |
| 4,865,633 | A | * | 9/1989 | Stevenson ................... 55/459.1 |
| 4,900,345 | A | * | 2/1990 | le Jeune .......................... 55/337 |
| 5,651,466 | A | * | 7/1997 | Satomi .......................... 209/734 |
| 6,322,601 | B1 | * | 11/2001 | Semedard et al. .............. 55/318 |
| 6,787,194 | B2 | * | 9/2004 | Eidelman ...................... 427/447 |
| 6,910,432 | B2 | * | 6/2005 | D'Agostini et al. ........... 110/348 |
| 6,968,791 | B2 | * | 11/2005 | D'Agostini et al. ........... 110/347 |
| 7,004,089 | B2 | * | 2/2006 | Dernjatin et al. .............. 110/245 |
| 7,069,867 | B2 | * | 7/2006 | Marin et al. ................... 110/347 |
| 7,185,595 | B2 | * | 3/2007 | D'Agostini et al. ........... 110/347 |
| 7,316,564 | B2 | * | 1/2008 | Muschelknautz et al. ...... 432/16 |
| 8,226,913 | B2 | * | 7/2012 | Comrie .......................... 423/210 |
| 2006/0096933 | A1 | | 5/2006 | Maier |
| 2009/0139938 | A1 | * | 6/2009 | Larnholm et al. ............. 210/788 |
| 2012/0012006 | A1 | * | 1/2012 | Fadda ............................. 96/177 |
| 2012/0168361 | A1 | * | 7/2012 | Motakef ........................ 210/137 |
| 2012/0180661 | A1 | * | 7/2012 | Di Berardo et al. ............. 95/258 |

FOREIGN PATENT DOCUMENTS

| | | | |
|---|---|---|---|
| JP | 5-277444 A | | 10/1993 |
| JP | 11-287433 A | | 10/1999 |
| JP | 2001-149815 A | | 6/2001 |
| JP | 2004-97942 | * | 4/2004 |
| JP | 2004-097942 A | | 4/2004 |
| JP | 2004-347270 A | | 12/2004 |
| JP | 2005-241107 A | | 9/2005 |
| RU | 2060833 C1 | | 5/1996 |
| TW | 289077 | | 10/1996 |
| WO | 2006/085759 A1 | | 8/2006 |

OTHER PUBLICATIONS

International Search Report of PCT/JP2008/063255, mailing date of Oct. 21, 2008.
Russian Office Action dated Jun. 28, 2011, issued in corresponding Russian Patent Application No. 2010120239.
Taiwanese Office Action dated Jul. 11, 2011, issued in corresponding Taiwanese Patent Application No. 097126819.
Japanese Notice of Allowance dated Apr. 2, 2013, issued in corresponding Japanese Patent Application No. 2007-310591, w/ English translation.
Chinese Office Action dated Feb. 28, 2013, issued in corresponding Chinese Patent Application No. 200880115394.8, w/ partial English translation.
Mexican Office Action dated Mar. 5, 2013, issued in corresponding Mexican Patent Application No. MX/a/2010/0053247.
Chinese Notification of Grant of Invention Patent dated Jun. 25, 2013, issued in corresponding Chinese Patent Application No. 200880115394.8 w/concise explanation of relevance (3 pages).
Mexican Office Action dated Sep. 5, 2013, issued in corresponding Mexican Patent Application No. MX/a/2010/005327.
Notice of Allowance dated Feb. 19, 2014, issued in Taiwanese Patent Application No. 097126819 (3 pages) (w/ concise explanation of relevance).

* cited by examiner

FIG. 1A

SOLID-GAS TWO-PHASE FLOW

COLLECTED PARTICLES

AIR FLOW HAVING DILUTE PARTICLE CONCENTRATION

FIG. 1B

SOLID-GAS TWO-PHASE FLOW

PARTICLE SEPARATOR AND SOLID FUEL BURNER

TECHNICAL FIELD

The present invention relates to a particle separator that separates powder from a solid-gas two-phase flow and collects the powder. The present invention also relates to a solid fuel burner provided with the particle separator and applied to various types of combustion equipment using a solid fuel, such as a pulverized coal-fired boiler, a biomass-fired boiler, and a waste-fired boiler.

BACKGROUND ART

A solid-gas two-phase flow is used to transport powder on an air flow, and in the related art, the powder is separated from the air flow by a particle separator, such as a cyclone separator and a centrifugal separator. Such a particle separator is also used for a solid fuel burner (hereinafter, referred to as "burner") that burns a powdery low-combustibility fuel in a pulverized coal-fired boiler that uses a low-combustibility fuel, for example, anthracite coal, petroleum coke, biomass, and waste, made in the fine powdery form.

Also, it is anticipated that an air ratio is increased compared to an air-fuel ratio (A/C) in a pulverized coal-fired boiler in the related art during pulverization or at the time of supply depending on a fuel seed, such as biomass. In this case, air unnecessary for combustion has to be separated in the upper stream of the burner and the particle separator is used in this instance, too.

Figure 8A:
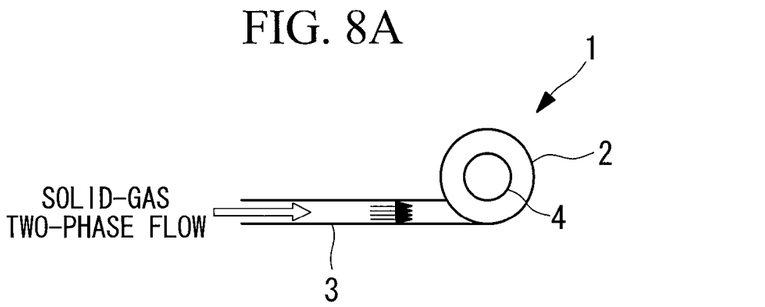
FIG. 8A is a horizontal cross section showing an example in the related art of a particle separator.
Figure 8B:
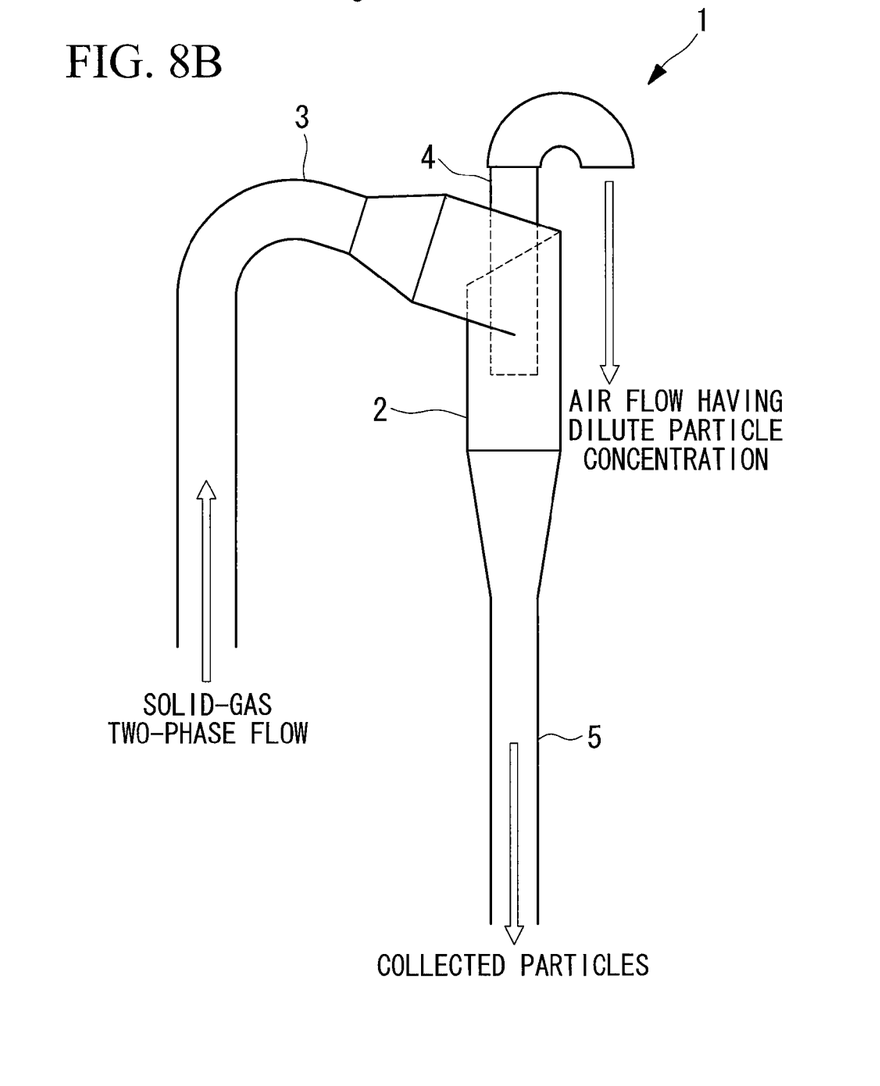
FIG. 8B is another view showing the example in the related art of the particle separator in the form of a front view of a major portion.

A particle separator 1 shown in FIG. 8A and FIG. 8B as an example in the related art includes a separator main body (hopper) 2 of a circular cylindrical or funnel shape having a circular sectional shape, a gas and solid supply tube 3 for letting a solid-gas two-phase flow stream inside the separator main body 2 from the circumferential direction, an air flow tube 4 provided at the shaft center position in the separator main body 2, and a particle tube 5 provided continuously at the bottom portion of the separator main body 2. In the particle separator 1, a solid-gas two-phase flow streaming inside the separator main body 2 from the circumferential direction flows as a swirling flow that flows in a swirl along the circular cross section. Accordingly, a centrifugal force induced by the swirling flow acts on the solid-gas two-phase flow and solid particles are separated from the air flow. More specifically, the relatively heavy solid particles collide on the wall surface and fall downward by gravity to be collected into the particle tube 5, whereas a relatively light air flow comes out upward from the air flow tube 4 that opens inside the separator main body 2. It should be noted that the separator main body (hopper) 2 is not necessarily shaped to have a circular cross section, and it may be shaped into a cylinder having a rectangular sectional shape or a polygonal sectional shape.

Figure 9A:
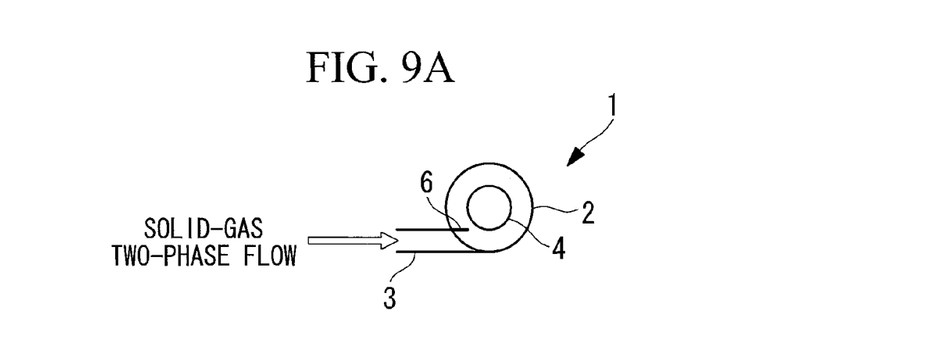
FIG. 9A is a horizontal cross section showing another example in the related art of the particle separator.
Figure 9B:
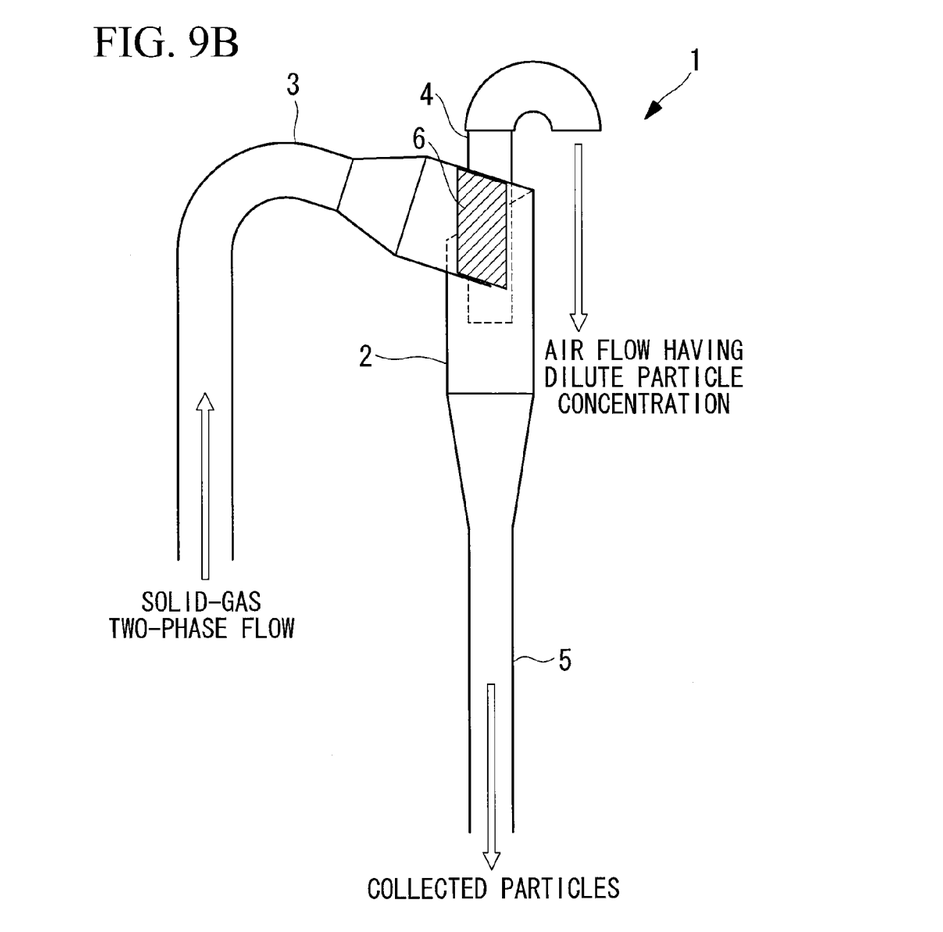
FIG. 9B is another view showing another example in the related art of the particle separator in the form of a front view of a major portion.

Also, according to another example in the related art shown in FIG. 9A and FIG. 9B, a guide plate 6 protruding toward inside the separator main body 2 from the outlet 3a of the solid and gas supply tube 3 is provided to a main body connecting portion at which the solid and gas supply tube 3 is connected to the separator main body 2. The guide plate 6 is a rectangular plate member provided for guiding the solid-gas two-phase flow streaming inside the separator main body 2 to flow in the wall surface direction, and is therefore capable of improving the collection efficiency of powder particles.

For a powder classifier that separates particles having a particle size larger than a specific particle size from particles included in an air flow and takes out particles having a particle size smaller than the specific particle size together with the air flow, there has been proposed a type including a movable wall body that increases and reduces the sectional area of an inlet channel of a powder-containing gas introducing tube and a movable guide plate that is rotatable about the vertical shaft inside a circular cylindrical body (for example, see Patent Document 1).

[Patent Document 1] Japanese Unexamined Patent Application, Publication No. Hei 5-277444 (see FIG. 1).

DISCLOSURE OF INVENTION

Incidentally, in order to enhance the collection efficiency of powder particles in the particle separator described above, the centrifugal force inside the separator main body is increased. Concrete means include: (1) increasing an inlet flow rate of the solid-gas two-phase flow; (2) increasing the diameter of the separator main body; (3) locating the position at which the solid and gas supply tube is connected to the separator main body on the outer peripheral side; and (4) providing a guide plate at the outlet of the solid and gas supply tube inside the separator main body.

However, when the means of increasing a flow rate of the solid-gas two-phase flow is adopted, because a pressure loss is increased, auxiliary machinery power, such as a fan, has to be augmented, which raises a cost increase problem.

Also, when the means of increasing the diameter of the separator main body is adopted, the device itself increases in size, which raises a cost increase problem.

In addition, when the means of attaching the solid and gas supply tube to the separator main body on the outer peripheral side, the device itself also increases in size, which raises a cost increase problem. Moreover, using a separator main body of the same diameter poses another problem that a pressure loss is increased.

Furthermore, when the means of providing the guide plate is adopted, because the guide plate shaped like a rectangular plate is present at a position to block a swirling flow developed inside the separator main body, a region where a turbulence occurs frequently in the swirling flow is generated in the vicinity of the guide plate. Such a turbulence of the swirling flow makes it difficult to achieve the most suitable shape of the guide plate particularly in the case of a particle separator in which a load fluctuation occurs. Accordingly, as with, for example, a particle separator used for a low-combustibility fuel burner in a pulverized coal-fired boiler that uses a low-combustibility fuel made in the fine powdery form, it is desirable to take a measure for enabling the device to respond to the occurrence of a load fluctuation that changes amounts of fuel and air to be supplied in response to a request from the boiler side.

Under the circumstances described above, for a particle separator that separates powder particles from a solid-gas two-phase flow, there has been a need to enhance the collection efficiency while suppressing an increase in cost resulting from an augmentation of auxiliary machinery power and an increase of the device size. In addition, for a particle separator in which a load fluctuation occurs, there has been a need to enhance the collection efficiency by preventing or suppressing a turbulence occurring in the swirling flow.

The present invention is devised in view of the foregoing, and has an object to provide a particle separator capable of enhancing the collection efficiency while minimizing an augmentation of auxiliary machinery power and an increase of the device size.

Another object of the present invention is to provide a particle separator capable of responding to the occurrence of a load fluctuation that changes an amount of a fuel to be supplied in response to a request from the boiler side as in a case where the particle separator is used for a solid fuel burner in a pulverized coal-fired boiler using a low-combustibility fuel made in the fine powdery form.

Still another object of the present invention is to provide a solid fuel burner provided with the particle separator described above and applied to various types of combustion equipment using a low-combustibility fuel, such as a pulverized coal-fired boiler.

In order to achieve the above objects, the present invention adopts the following solutions.

A particle separator according to a first aspect of the present invention is a particle separator that separates powder being transported on an air flow in a state of a solid-gas two-phase flow from the air flow and collects the powder, and the particle separator includes a drift generating portion provided in a vicinity of a main body connecting portion of a solid and gas supply tube for letting the solid-gas two-phase flow stream inside a separator main body from a circumferential direction and configured to concentrate a high powder particle concentration of the solid-gas two-phase flow on an outer peripheral side of the separator main body.

According to the particle separator configured as above, because the particle separator includes the drift generating portion provided in the vicinity of the main body connecting portion of the solid and gas supply tube for letting the solid-gas two-phase flow stream inside the separator main body from the circumferential direction and configured to concentrate a high powder particle concentration of the solid-gas two-phase flow on the outer peripheral side of the separator main body, particles in the solid-gas two-phase flow concentrate on the outer peripheral wall surface side of the separator main body and a particle centrifugal force is increased. It is thus possible to enhance the collection efficiency by separating the particles from the air flow efficiently.

As the drift generating portion in this case, a kicker block, a ribbon screw, and a combination thereof are available. In a case where the ribbon screw is provided to a straight tube portion, it is preferable to provide the kicker block upstream thereof, so that particles are drifted to preliminarily form a high particle concentration region in part of the tube cross section.

Also, the shape of the separator main body described above include a cylindrical shape or a funnel shape having a circular cross section, a rectangular cross section, a polygonal cross section, and so forth.

In the first aspect described above, it is preferable that wear resistance processing is applied to a peripheral member to which the drift generating portion is provided. When configured in this manner, it is possible to enhance the wear resistance in a portion with which the solid-gas two-phase flow having an increased powder particle concentration comes into contact.

A particle separator according to a second aspect of the present invention is a particle separator that separates powder being transported on an air flow in a state of a solid-gas two-phase flow from the air flow and collects the powder, and the particle separator includes a guide plate provided to a main body connecting portion of a solid and gas supply tube for letting the solid-gas two-phase flow stream inside a separator main body having a circular sectional shape from a circumferential direction and configured in such a manner that an amount of protrusion toward inside the separator main body from an outlet of the solid and gas supply tube is variable.

According to the particle separator configured as above, because the particle separator is provided with the guide plate provided to the main body connecting portion of the solid and gas supply tube for letting the solid-gas two-phase flow stream inside the separator main body from the circumferential direction and configured in such a manner that an amount of protrusion toward inside the separator main body from the outlet of the solid and gas supply tube is variable, it is possible to maintain satisfactory collection efficiency in response to a load fluctuation by adjusting an amount of protrusion according to which the guide plate is operated at the occurrence of a load fluctuation according to which the particle concentration and the air flow rate change.

In the second aspect described above, it is preferable that the guide plate is cut off in a taper shape at a bottom corner portion of a rectangular shape that falls on a center side of the separator main body. When configured in this manner, it is possible to suppress or prevent a turbulence occurring in a swirling flow resulting from the presence of the guide plate.

A solid fuel burner according to a third aspect of the present invention separates a powdery solid fuel supplied together with air in any one of the particle separators described above, and burns the solid fuel by distributing the solid fuel to a high-concentration portion nozzle and a low-concentration portion nozzle provided inside a furnace.

According to the solid fuel burner configured as above, because it is configured in such a manner that a powdery solid fuel supplied together with air is separated in any one of the particle separators described above, it is possible to enhance the collection efficiency of the fuel particles as well as to maintain satisfactory collection efficiency in response to a load fluctuation.

According to the present invention described above, it is possible to provide a particle separator capable of enhancing the collection efficiency while minimizing an augmentation of auxiliary machinery power and an increase of the device size.

It is also possible to provide a particle separator capable of responding to the occurrence of a load fluctuation that changes an amount of a fuel to be supplied in response to a request from the boiler side as in a case where the particle separator is used for a low-combustibility fuel burner in a pulverized coal-fired boiler using a low-combustibility fuel made in the fine powdery form.

Furthermore, it is possible to provide a solid fuel burner provided with a particle separator that is applicable to various types of combustion equipment using a low-combustibility fuel, such as a pulverized coal-fired boiler, and not only capable of enhancing the collection efficiency while minimizing an augmentation of auxiliary machinery power and an increase of the device size but also capable of responding to the occurrence of a load fluctuation that changes an amount of a solid fuel to be supplied in response to a request from the boiler side.

EXPLANATION OF REFERENCE 1A and 1B: particle separator (separator)
2: separator main body
3: solid and gas supply tube
4: air flow tube
5: particle tube
10: drift generating portion
11: kicker block
12 and 12A: ribbon screw
20: guide plate
21: taper portion
30: low-combustibility fuel burner (burner)

BEST MODE FOR CARRYING OUT THE INVENTION

Hereinafter, embodiments of a particle separator and a solid fuel burner of the present invention will be described on the basis of the drawings.

First Embodiment

Figure 1A:
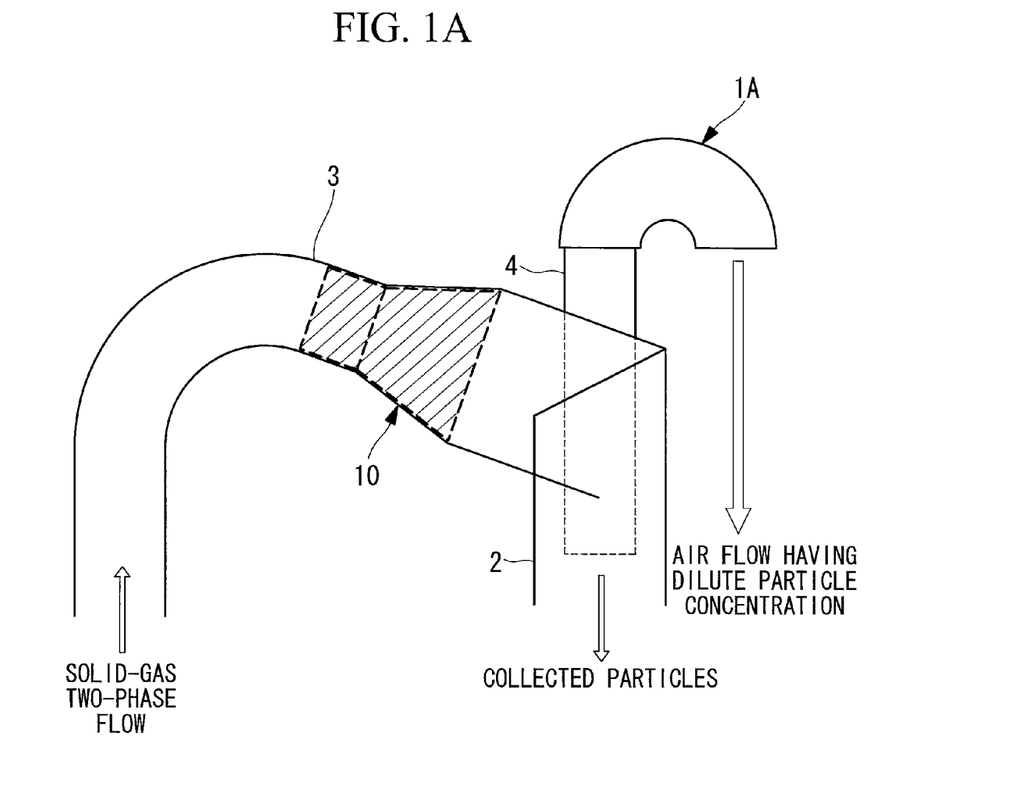
FIG. 1A is a view showing a first embodiment of a particle separator of the present invention in the form of a front view of a major portion.
Figure 1B:
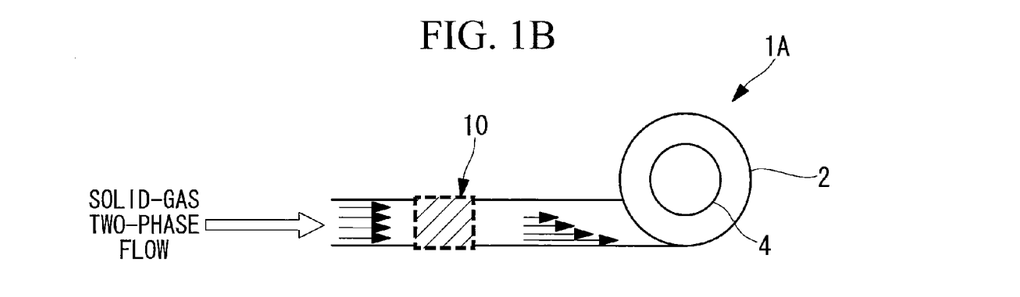
FIG. 1B is another view showing the first embodiment of the particle separator of the present invention in the form of a horizontal cross section of FIG. 1A.

A particle separator 1A shown in FIG. 1A and FIG. 1B includes a separator main body 2 of a circular cylindrical shape, a solid and gas supply tube 3 for letting a solid-gas two-phase flow stream inside the separator main body 2 from the circumferential direction, an air flow tube 4 provided at the shaft center position of the separator main body 2, and a particle tube (not shown) provided continuously at the bottom portion of the separator main body 2. Because the particle separator 1A is configured in such a manner that a solid-gas two-phase flow streaming inside the separator main body 2 from the circumferential direction flows as a swirling flow that flows in a swirl along the circular cross section, a centrifugal force induced by the swirling flow acts on the solid-gas two-phase flow.

In this embodiment and embodiments described below, the separator main body 2 is provided with a cone portion (reducer, circular cone portion) whose diameter is reduced gradually at the bottom portion of a circular cylindrical shape having a circular sectional shape. The separator main body 2 of the present invention, however, is not limited to this configuration, and the present invention is also applicable to a cylindrical or funnel-shaped separator main body having a rectangular cross section or a polygonal cross section.

Accordingly, particles having a relatively large particle diameter and heavy solid particles collide on the wall surface of the separator main body 2 under the influence of a centrifugal force developed when poured therein and fall downward by gravity, whereas a relatively light air flow comes out upward from the air flow tube 4 that opens inside the separator main body 2. The solid particles separated from the air flow are therefore collected into the particle tube and guided to a desired place. It should be noted that an air flow coming out from the air flow tube 4 is an air flow having a dilute concentration of particles to be exact, and collected particles falling down into the particle tube may possibly include an air flow.

For the particle separator 1A configured as above, in this embodiment, a drift generating portion 10 that concentrates a high powder particle concentration to a desired direction is provided to the solid and gas supply tube 3 for letting the solid-gas two-phase flow stream inside the separator main body 2 from the circumferential direction. The drift generating portion 10 is provided in the vicinity of a main body connecting portion at which the solid and gas supply tube 3 is connected to the separator main body 2, and is configured so as to drift the solid-gas two-phase flow for the powder particle concentration to concentrate on the outer peripheral side of the separator main body 2. In other words, the solid-gas two-phase flow having passed through the drift generating portion 10 streams inside the separator main body 2 in a state where it is drifted so that the powder particle concentration becomes higher as headed toward the outer peripheral side of the separator main body 2 in the cross section of the solid and gas supply tube 3.

Because the particle separator 1A as above includes the drift generating portion 10 described above, particles in the solid-gas two-phase flow concentrate toward the outer peripheral wall surface side of the separator main body 2, and a particle centrifugal force is increased. Accordingly, because powder particles heavier than molecules of an air flow are subject to a centrifugal force considerably, they lose the momentum upon collision on the outer wall of the separator main body 2 and separate from the air flow as they fall down by gravity. In other words, an air flow, which is lighter than the powder particles and is therefore hardly subject to a centrifugal force, comes out to the outside of the separator main body 2 by passing through the air flow tube 4, whereas the powder particles, which have been subjected to a centrifugal force considerably and separated from the air flow, fall downward in the separator main body 2. It is thus possible to enhance the collection efficiency by letting the powder particles be separated from the air flow.

It is preferable to apply processing to enhance wear resistance, such as to laminate a ceramic member and to provide wear-resistant hardened build-up (25 Cr cast iron, CHR-3, and so forth), to a peripheral member to whom the drift generating portion 10 described above is provided. Such wear resistance processing is to prevent wearing on the wall surface caused when the solid-gas two-phase flow is drifted and changed to a flow having a high particle concentration and the powder particles collide concentrically in part of the wall surface of the channel. The wear resistance processing can enhance the wear resistance of the device when applied to places, such as the inner wall surface of the solid and gas supply tube 3 to which the drift generating portion 10 is provided, and the inner wall surface on which a flow having a high powder particle concentration collides on the periphery of the flow inlet at which the solid and gas supply tube 3 is connected to the separator main body 2.

Herein, examples of the concrete configuration of the drift generating portion 10 described above will be described on the basis of the drawings including FIG. 2A through FIG. 4B.

Figure 2A:
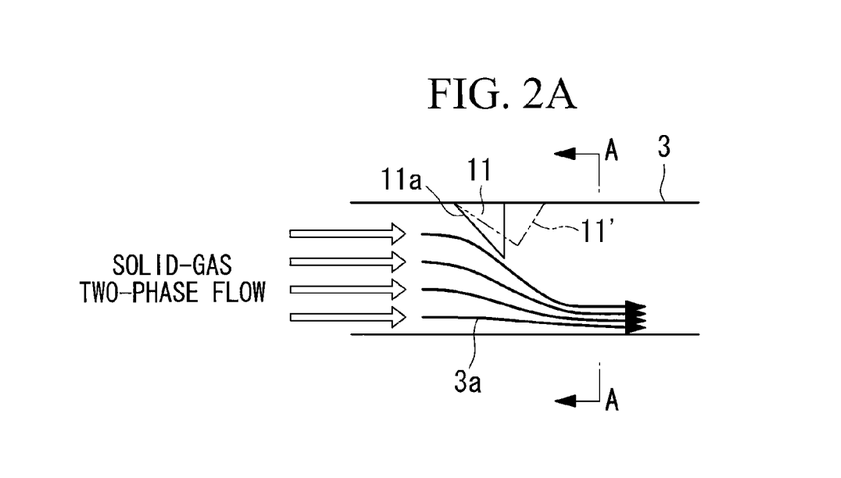
FIG. 2A is a horizontal cross section showing a first concrete example of a drift generating portion shown in FIG. 1A and FIG. 1B.
Figure 2B:
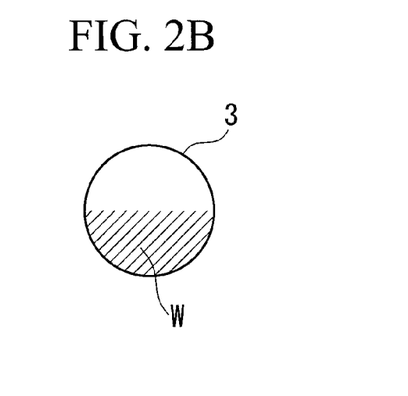
FIG. 2B is another view showing the first concrete example of the drift generating portion shown in FIG. 1A and FIG. 1B in the form of a cross section taken on line A-A of FIG. 2A.

In a first concrete example shown in FIG. 2A and FIG. 2B, a kicker block 11 is attached as the drift generating portion. The kicker block 11 is a member having an almost triangular cross section and attached fixedly inside the solid and gas supply tube 3. It generates a flow having a high particle concentration headed toward the outer peripheral wall surface side of the separator main body 2 by concentrating the solid-gas two-phase flow to almost half the tube cross section on the upstream side of the main body connecting portion of the separator main body 2.

More specifically, as is shown in FIG. 2A, the solid-gas two-phase flow flowing through the solid and gas supply tube 3 is blocked by the kicker block 11 at almost half the tube cross section, and at the same time, it is guided toward the inside tube opening 3a by the inclined surface 11a of the kicker block 11. Accordingly, the solid-gas two-phase flow having passed through the kicker block 11 drifts so as to flow by passing through the inside tube opening 3a, which is almost half the tube cross section, as indicted by shading W in FIG. 2B. This drifted portion and a following flow become a flow having a high particle concentration. Hence, by configuring in such a manner that the inside tube opening 3a formed in the solid and gas supply tube 3 by the kicker block 11 falls on the outer peripheral wall side of the separator main body 2, it becomes possible to flow the solid-gas two-phase flow, which is drifted and thereby has a high particle concentration, toward the outer peripheral wall surface side of the separator main body 2.

The sectional shape of the kicker block 11 is not particularly limited. For example, as a kicker block 11' indicted by a virtual line in FIG. 2A, an almost triangular cross section having an inclined surface also on the following flow side is available, too.

Figure 3:
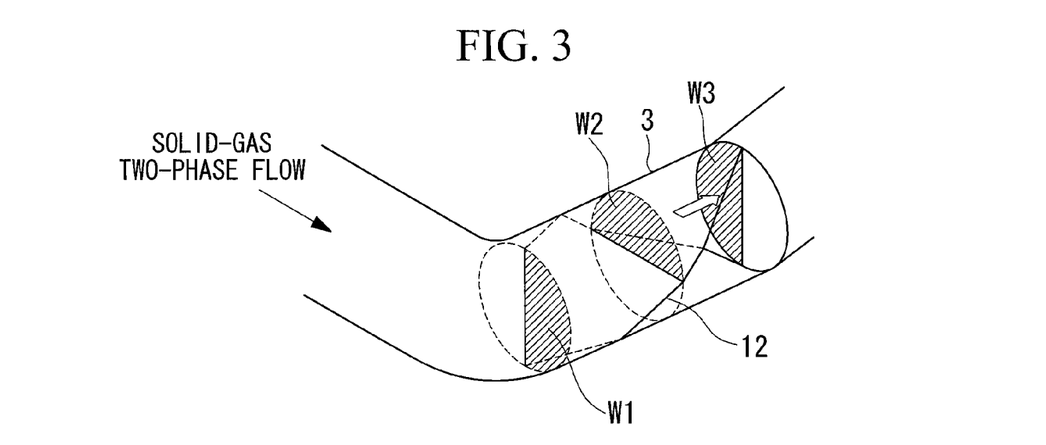
FIG. 3 is a cross section showing a second concrete example of the drift generating portion shown in FIG. 1A and FIG. 1B.

In a second concrete example shown in FIG. 3, a ribbon screw 12 is attached as the drift generating portion. The ribbon screw 12 is a member molded into the shape of a screw by twisting a plate-shaped member and provided fixedly inside the solid and gas supply tube 3. For example, as is shown in FIG. 3, the ribbon screw 12 is capable of changing regions where the particle concentration of the drifted solid-gas two-phase flow is high when provided downstream of the elbow of the solid and gas supply tube 3 or any other appropriate place.

More specifically, because the solid-gas two-phase flow having passed through the elbow is drifted in a state where the particle concentration on the outer side is increased under the influence of a centrifugal force (shading W1 in the drawing), regions where the particle concentration is high, W1, W2, and W3, change in that order as the drifted solid-gas two-phase flow passes through the ribbon screw 12. Accordingly, in the example of FIG. 3, after the solid-gas two-phase flow, which is drifted by passing through the elbow, passes through the ribbon screw 12, a region where the particle concentration is high has moved by an almost 180° turn to a region on the opposite side in the tube cross section of the solid and gas supply tube 3 (from the outer peripheral side to the inner peripheral side of the elbow).

Hence, by setting the outlet of the ribbon screw 12 in the vicinity of the inlet of the separator main body 2 so that the region drifted and having a high particle concentration falls on the outer peripheral side of the separator main body 2, it becomes possible to flow the solid-gas two-phase flow, which is drifted and thereby has a high particle concentration, toward the outer peripheral wall surface side of the separator main body 2. The ribbon screw 12 as above is particularly effective to change regions where a particle concentration is high in a case where a drift is generated because of an elbow or a bent tube present in the vicinity of the inlet of the separator main body 2.

Figure 4A:
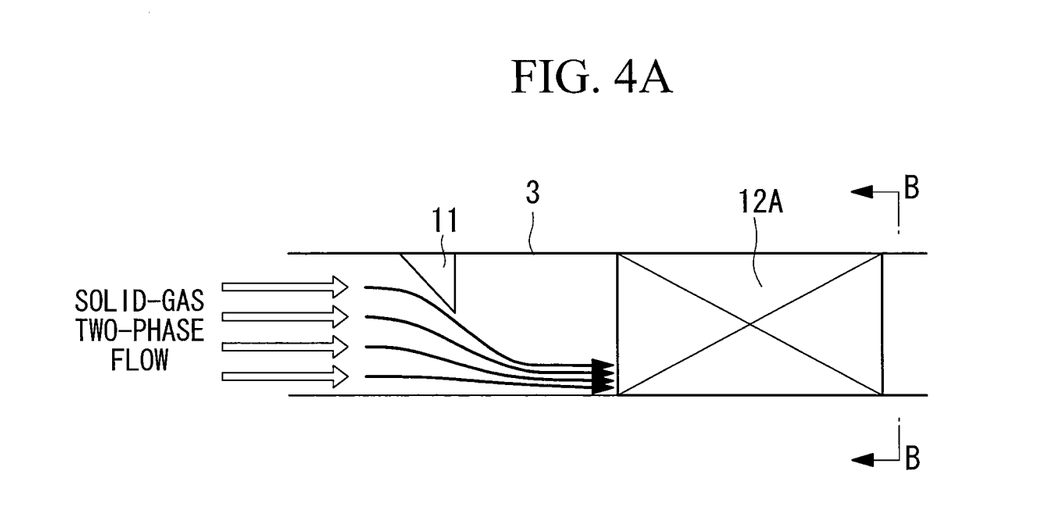
FIG. 4A is a horizontal cross section showing a third concrete example of the drift generating portion shown in FIG. 1A and FIG. 1B.
Figure 4B:
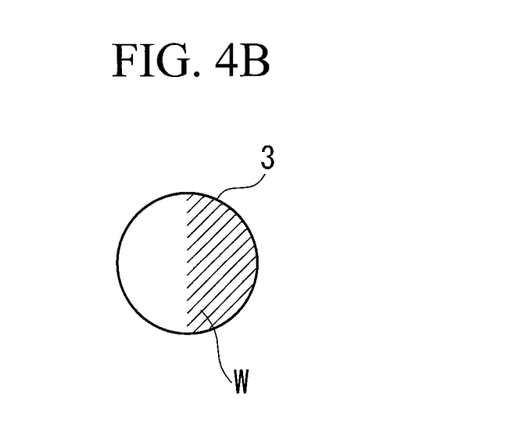
FIG. 4B is another view showing the third concrete example of the drift generating portion shown in FIG. 1A and FIG. 1B in the form of a cross section taken on line B-B of FIG. 4A.

In a third concrete example shown in FIG. 4A and FIG. 4B, a ribbon screw 12A is attached to a straight tube portion. In this case, the kicker block 11 is attached as a device to generate a drift on the upstream side of the ribbon screw 12A. In other words, in a case where the ribbon screw 12A is adopted to a straight tube portion of the solid and gas supply tube 3 where no drift is generated in the solid-gas two-phase flow, it is necessary to generate a drift preliminarily on the upstream side. Shading W shown in FIG. 4B indicates a region where a particle concentration is high at the outlet of the ribbon screw 12A.

When configured in this manner, not only can the ribbon screw 12A be applied to the straight tube portion, but also a concentration of the powder particles can be increased further by the ribbon screw 12A on the following flow side.

In this manner, by selecting and adopting the kicker block 11, the ribbon screw 12, or a combination thereof to be adopted as the drift generating portion as needed, it becomes possible to let the solid-gas two-phase flow Stream with a region where a powder particle concentration is high headed toward the outer peripheral wall side of the separator main body 2 in a reliable manner depending on the tube structure of the solid and gas supply tube 3 connected to the separator main body 2, that is, depending on whether a portion where a drift is generated, such as an elbow, is present in the solid and gas supply tube 3 in the vicinity of the inlet of the separator main body 2.

Second Embodiment

A second embodiment of the present invention will now be described on the basis of FIG. 5A and FIG. 5B. Like components are labeled with like reference numerals with respect to the embodiment described above, and a detailed description of such components is omitted herein.

Figure 5A:
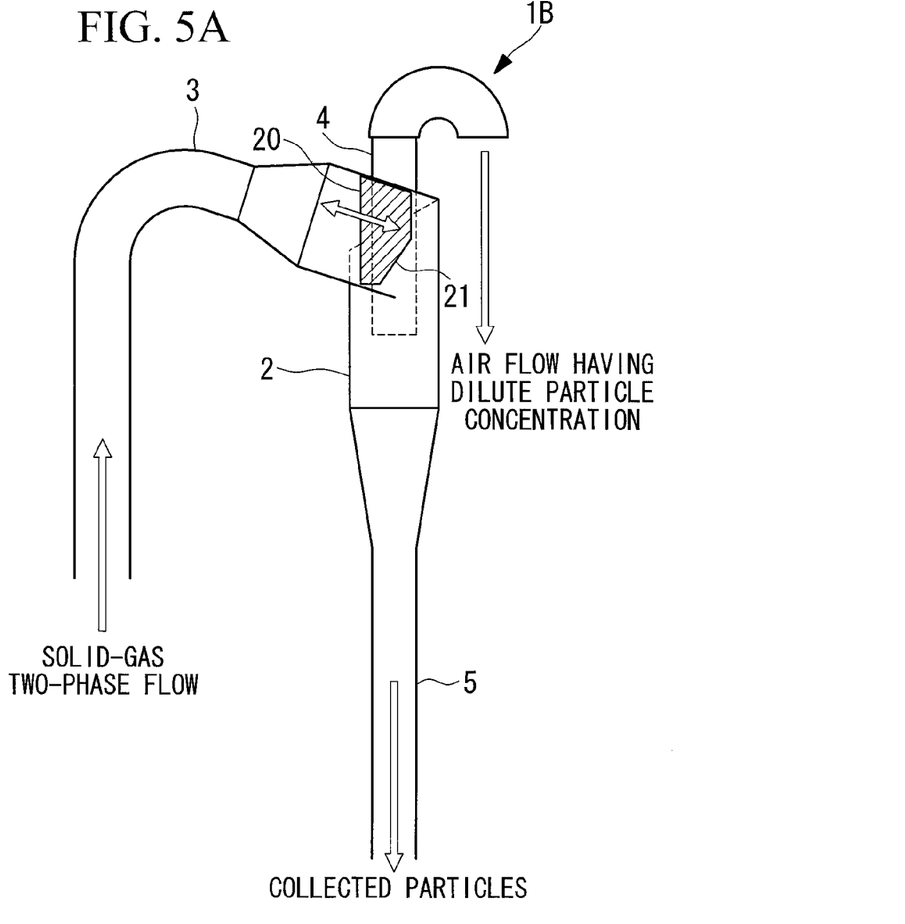
FIG. 5A is a view showing a second embodiment of the particle separator of the present invention in the form of a front view of a major portion.
Figure 5B:
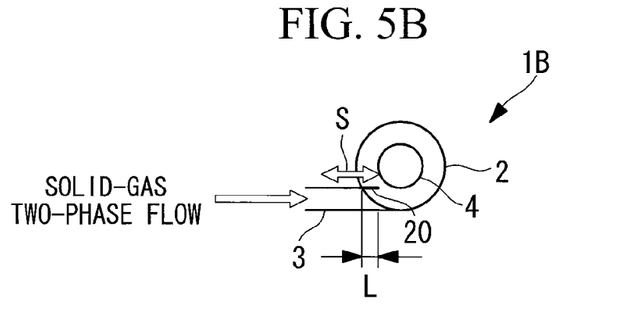
FIG. 5B is another view showing the second embodiment of the particle separator of the present invention in the form of a horizontal cross section of FIG. 5A.

A particle separator 1B shown in FIG. 5A and FIG. 5B is provided with a guide plate 20 configured in such a manner that an amount of protrusion thereof is variable inside the separator main body 2 in which powder being transported on an air flow in a state of the solid-gas two-phase flow is separated from the air flow and collected. The guide plate 20 is attached to the main body connecting portion at which the solid and gas supply tube 3 for letting the solid-gas two-phase flow stream inside from the circumferential direction is connected to the separator main body 2 in a slidable (movable) manner as indicated by an arrow S in the drawing, so that an amount of protrusion L, inside the separator main body 2 from the outlet of the solid and gas supply tube 3, can be adjusted as needed.

More specifically, the amount of protrusion L is made variable by attaching the guide plate 20 to the inner peripheral side of the connecting portion (on the shaft center side of the separator main body 2) of the solid and gas supply tube 3 connected to the separator main body 2 so as to enable sliding toward the inner direction of the separator main body 2 in a reciprocable manner. It is thus possible to adjust the guide plate 20 whose amount of protrusion L is variable to be at the most suitable position by changing the amount of protrusion L in response to a change of the solid-gas two-phase flow. In other words, by adjusting the amount of protrusion L of the guide plate 20 in response to a load fluctuation according to which a particle concentration and an air flow rate of the solid-gas two-phase flow change, it is possible to maintain satisfactory collection efficiency in response to a load in an operating state.

Incidentally, the guide plate 20 shown in the drawing is provided with a taper portion 21 made by cutting off a corner of a rectangular shape. The taper portion 21 is a portion made by cutting off the lower corner that falls on the center side (inner side) of the separator main body 2, and it is formed by eliminating a triangular plate material so as to reduce an area to which a flow swirling inside the separator main body 2 collides.

The guide plate 20 provided with the taper portion 21 is thus capable of suppressing or preventing a turbulence occurring in the swirling flow developed inside the separator main body 2 due to the presence of the guide plate 20. In other words, not only can the taper portion 21 of the guide plate 20 prevent an increase of a pressure loss by preventing or suppressing the occurrence of a turbulent flow in the swirling flow inside the separator main body 2, but it can also enhance the collection efficiency.

Third Embodiment

A solid fuel burner as an example of an application of the particle separator 1A provided with the drift generating portion 10 as above will now be described. In the following, a low-combustibility fuel burner (hereinafter, referred to as "burner") 30 to be attached to a pulverized coal-fired boiler using a low-combustibility fuel made in the fine powdery form will be described on the basis of FIG. 6 and FIG. 7 as an example of the solid fuel burner.

Figure 6:
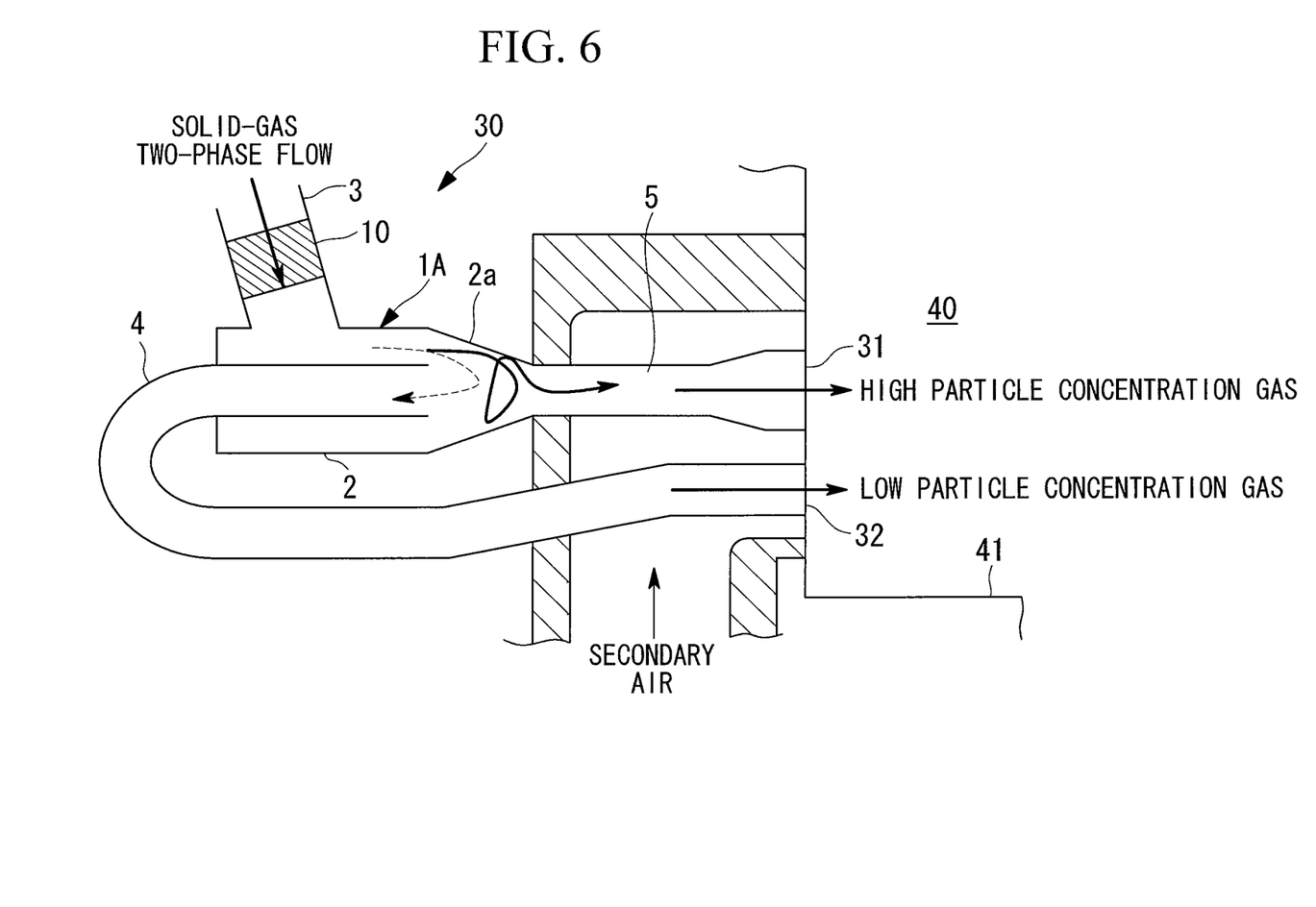
FIG. 6 is a cross section showing an example of the configuration of a solid fuel burner (low-combustibility fuel burner) as a third embodiment of the present invention.

The burner 30 is used as it is installed inside a furnace 40, such as a pulverized coal-fired boiler. The burner 30 is a device that burns particulate (fine powder) of a low-combustibility fuel to be supplied together with air inside the furnace 40. Examples of the low-combustibility fuel include anthracite coal and petroleum coke.

Hereinafter, a description will be given to the burner 30 that burns pulverized coal as a fuel, which is anthracite coal as a low-combustibility fuel and made in the fine powdery form, upon supply thereof.

The burner 30 is formed of a pulverized coal supply system that receives a supply of pulverized coal together with relatively cool primary air at about 100° C., and a secondary air system that receives a supply of relatively hot secondary air at about 300 to 350° C.

The pulverized coal supply system is located almost at the center portion of the burner 30, and includes a particle separator (hereinafter, referred to as the separator) 1A that distributes a mixed fluid of primary air and pulverized coal to a high-concentration portion and a low-concentration portion described below with the aim of enhancing ignition. The separator 1A is formed as a cyclone utilizing centrifugal separation, and a solid and gas supply tube (primary air tube) 3 used to supply a mixed fluid (solid-gas two-phase flow) of a fuel and air from a tangential direction is connected to the side surface of the separator main body (outer cylinder) 2. A particle tube (high particle concentration gas tube) 5 is connected to a narrow diameter portion 2a made by reducing the separator main body 2 to have a circular conical shape, and a high-concentration portion nozzle 31 opening toward inside the furnace 40 is attached to the tip end thereof.

Furthermore, an air flow tube (low particle concentration gas tube) 4 is inserted concentrically inside the separator main body 2. The air flow tube 4 comes out from the separator main body 2 to the opposite side of the particle tube 5 and turns around, and a low-concentration portion nozzle 32 is provided to the tip end thereof adjacently to the high-concentration portion nozzle 31 at almost the same level. The opening 4a of the air flow tube 4 is downstream (on the high-concentration portion nozzle 31 side) of the connecting portion of the solid and gas supply tube 3 in a flow direction of the mixed fluid.

Regarding the positional relation between the high-concentration portion nozzle 31 and the low-concentration portion nozzle 32, the low-concentration portion nozzle 32 used to burn a low particle concentration gas is disposed on the side closer to the furnace wall 41 forming the furnace 40.

The separator 1A in the burner 30 configured as above is provided with the drift generating portion 10 at an appropriate portion in the vicinity of the main body connecting portion of the solid and gas supply tube 3. The drift generating portion 10 can be selected as needed from the kicker block 11, the ribbon screw 12, and a combination thereof so as to best suit the configuration of the solid and gas supply tube 3.

As has been described, by adopting the separator 1A in which the drift generating portion 10 is provided to the solid and gas supply tube 3, it becomes possible to enhance the collection efficiency of pulverized coal particles to be supplied to a high particle concentration gas as a fuel.

Also, in the burner 30 described above, it is possible to adopt the particle separator 1B provided with the guide plate 20 as is shown in FIG. 5A and FIG. 5B as a separator. As with the drift generating portion 10, it is possible to enhance the collection efficiency of pulverized coal particles to be supplied to a high particle concentrate gas as a fuel.

Figure 7:
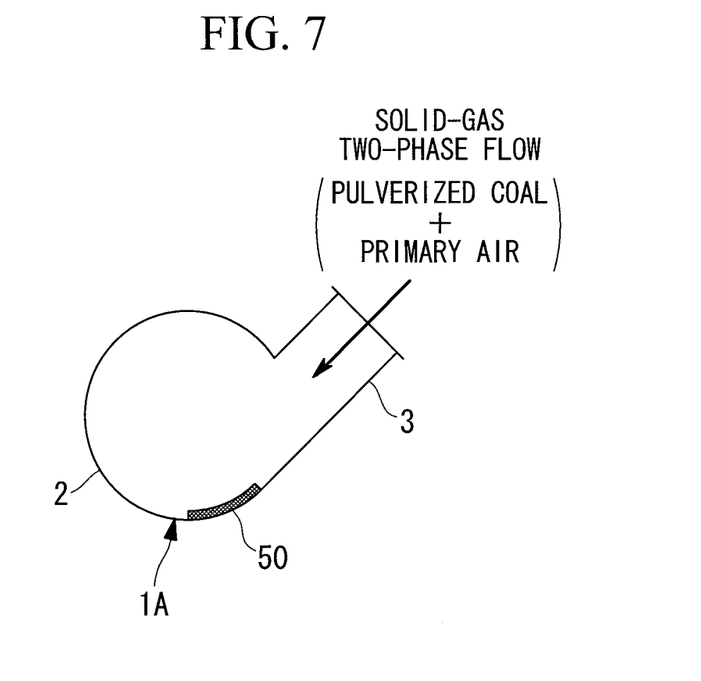
FIG. 7 is a view used to describe an example of a position at which wear resistance processing is applied.

For the separator main body 2 in which a solid-gas two-phase flow having a high particle concentration flows by an action of the drift generating portion 10, increasing the thickness or using a high-chrome material may be possible on the inner wall surface of the circular cylindrical portion that serves as the top portion or the cone portion that serves as the bottom portion. However, in a case where a further wear resisting capability is required, for example, as is shown in FIG. 7, it is preferable to enhance the durability by forming a wear resistance processing portion 50 by applying processing, such as to laminate a ceramic material and to provide wear resistance hardened build-up (25 Cr cast iron, CHR-3, and so forth).

Alternatively, the cone portion of the separator main body 2 described above may adopt a divisible structure, so that the cone portion alone is replaced as a wear resistance measure.

According to the particle separators 1A and 1B of the present invention described above, it is possible to enhance the collection efficiency while minimizing an augmentation of the auxiliary machinery power and an increase of the device size. Also, the particle separator 1B of the present invention as described above is capable of responding to the occurrence of a load fluctuation that changes an amount of a fuel to be supplied in response to a request from the boiler side in a case where it is adopted for a solid fuel burner, for example, the burner 30 in a pulverized coal-fired boiler.

Furthermore, when applied to various types of combustion equipment using a solid fuel, such as a pulverized coal-fired boiler using a low-combustibility fuel, the particle separators 1A and 1B of the present invention can enhance the collection efficiency while minimizing an augmentation of the auxiliary machinery power and an increase of the device size, and is also capable of responding to the occurrence of a load fluctuation that changes an amount of a fuel to be supplied in response to a request from the boiler side.

It should be appreciated that the present invention is not limited to the embodiments described above, and can be modified as needed without deviating from the scope of the present invention.

The invention claimed is:

1. A particle separator that separates powder being transported on an air flow in a state of a solid-gas two-phase flow from the air flow and collects the powder, comprising:
   a slidable guide plate provided to a main body connecting portion of a solid and gas supply tube for letting the solid-gas two-phase flow stream inside a separator main body from a circumferential direction and configured in such a manner that an amount of protrusion toward inside the separator main body from an outlet of the solid and gas supply tube is variable, the slidable guide plate being cut off in a taper shape at a bottom corner portion of a rectangular shape that falls on a center side of the separator main body.

2. A solid fuel burner that separates a powdery solid fuel supplied together with air in the particle separator set forth in claim 1, and burns the solid fuel by distributing the solid fuel to a high-concentration portion nozzle and a low-concentration portion nozzle provided inside a furnace.

* * * * *